March 24, 1931.    M. S. SCOFIELD    1,797,622
LIQUID AGITATOR
Filed May 7, 1929
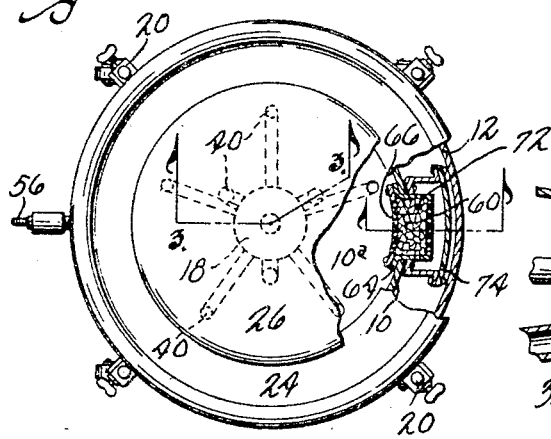
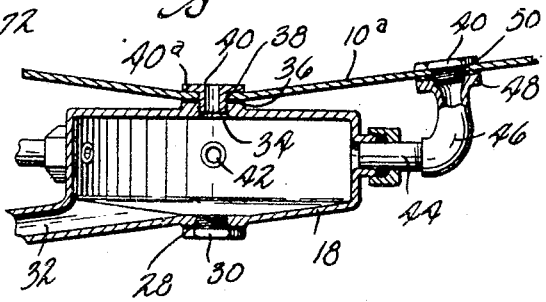
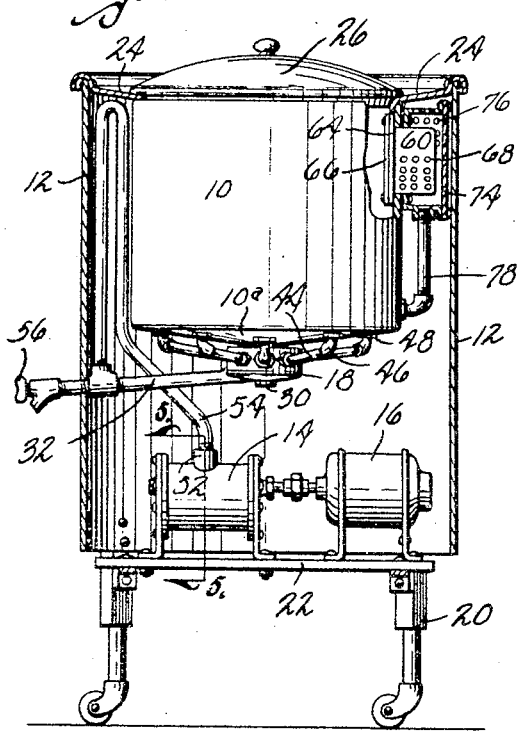
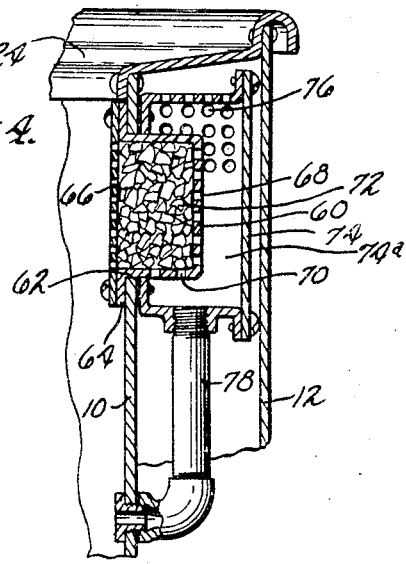
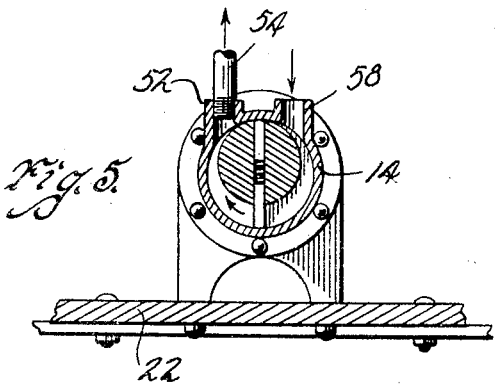
Inventor
Mark S. Scofield
By Bair, Freeman & Sinclair
Attorneys Patented Mar. 24, 1931

1,797,622

UNITED STATES PATENT OFFICE

MARK S. SCOFIELD, OF COLUMBUS, OHIO

LIQUID AGITATOR

Application filed May 7, 1929. Serial No. 361,181.

My present invention has to do with liquid agitators used for example in clothes washing machines, dish washers and the like.

More particularly, it is my object to provide a structure including a container for liquid and having novel means for supplying air to the container for agitating the liquid therein, and also having novel means for separating the liquid from the air discharging from the container, and returning the liquid so separated to the container.

With these and other objects in view, my invention consists in the construction, arrangement and combination of the various parts of my liquid agitator, whereby the objects contemplated are attained, as hereinafter more fully set forth, pointed out in my claims, and illustrated in the accompanying drawings, in which:

Figure 1 shows a top or plan view of a liquid agitator embodying my invention, parts being broken away and parts being shown in section.

Figure 2 shows a vertical, sectional view through the liquid agitator.

Figure 3 shows a vertical, sectional view of the bottom part of the container and the chamber below the container taken on the line 3—3 of Figure 1.

Figure 4 is a vertical, detail, sectional view taken on the line 4—4 of Figure 1, illustrating the air and water separating device; and Figure 5 is a vertical, detail, sectional view taken on the line 5—5 of Figure 2 illustrating the pump structure.

I preferably use in my improved liquid agitator a container indicated by the numeral 10, a shell spaced therefrom laterally and projecting below the container, a pump 14 and a motor 16.

Air is pumped by the pump 14 through a chamber 18 which communicates with the bottom of the container 10 at a plurality of spaced points.

The shell 12 is preferably supported on suitable legs 20. The legs also support a platform 22 hereinafter referred to. The upper parts of the shell 12 and container 10 are connected by a cover member 24, shown in Figure 2 and in Figure 4. The cover member 24 serves the function of supporting the container 10 on the shell 12 and the further function of a closure member for retaining the air between the container 10 and the shell 12, and also the function of a drain member.

There is a removable cover or top 26 provided for the container 10. The container 10 in the illustrative device here shown may be used as a washing machine tub.

On the platform 22 are supported the motor 16 and the pump 14. The pump 14 may be of any suitable structure for instance as shown in section in Figure 5.

The container 10 has a bottom 10a, which is preferably arranged to drain to a certain point, as illustrated in Figures 2 and 3.

The chamber 18 is preferably so made that it can be mounted on the container 10 as an attachment. It may be in the form of a relatively shallow cylindrical member, having a bottom adapted to drain to the drain outlet 28, which has the closure plug 30 and to the drain outlet pipe 32.

The chamber 18 has a central opening 34 in its top, with an upwardly projecting flat-faced boss 36 internally screw-threaded. The bottom 10a of the tub container has an opening 38 at its lowest point, and the chamber 18 may be fastened to the container and arranged in communication therewith by means of a hollow plug 40, having a flange 40a at its upper end, and having its lower part projected through the hole 38 and threaded into the boss 36, all as shown in Figure 3.

The chamber 18 has a plurality of outlet openings 42 in its side wall. Extending from the openings 42 are pipes 44, which connect with elbows 46, which incline upwardly to the bottom 10a and are provided at their upper ends with the flanges 48.

The upper ends of the elbows 36 are internally screw-threaded to receive tubular plugs 40 similar to that already described, which are extended through holes 50 in the bottom 10a. The outlet 52 from the pump 14 is connected with a pipe 54, which extends upwardly, as shown in Figure 2, alongside the container 10 to the upper part thereof, and thence downwardly to the drain pipe 32, so as to afford a water seal.

The drain pipe 32 projects through the shell 12 and has a control cock 56 at its outer end.

The inlet of the pump 14 is shown at 58 in Figure 5.

It will be seen that when the pump is operated, air will be forced through the pipe 54 and the drain pipe 32 into the chamber 18 and thence through the holes 34 and 42 to the lower part of the container 10, and as this air passes upwardly through the liquid content of the container 10, it agitates the water or other liquid for furthering a washing operation.

It is obvious that the air must then be allowed to pass out of the container 10. The air passing out of the container contains considerable moisture, which should be separated from it. The air carries with it also soap bubbles, which should be separated and returned to the container 10. For removing the soap bubbles and the greater part of the moisture from the air passing from the container 10, I provide the following means:

There is mounted on the side of the container 10 at the upper part thereof a holder indicated generally at 60 (see Figure 4). This holder is in the form of a casing mounted in a suitable opening 62 in the upper side wall of the container 10. The casing preferably has at its inner part a flange 64 fitted around the opening 62.

A perforated cover plate 66 forms the inner wall of the holder 60. The holder 60 projects outwardly from the container 10 as shown. It is preferably substantially rectangular in horizontal cross section. Its rear wall is preferably provided with perforations as at 68, and its bottom wall is also preferably provided with perforations as at 70.

The holder 60 preferably has chunks of carbon or the like 72 therein. The carbon serves to separate the bubbles of soap from the air. The air and the moisture passing through the perforations 68 and 70 is discharged into a separator casing 74 mounted on the outside of the upper wall of the container 10 and receiving the outwardly projecting part of the holder 60, as shown best in Figures 2 and 4.

The separator casing 74 has side walls 74a provided in their upper parts with holes or perforations 76 through which air may pass into the space between the upper part of the container 10 and the upper part of the shell 12.

A pipe 78 leads from the bottom of the separator casing 74 to the lower part of the container 10 for returning water of condensation of the separator casing 74 to the container 10.

I will now refer in greater detail to the practical operation of my improved liquid agitator and also explain some of its advantages.

Assume that a batch of clothes to be washed have been placed in the container 10 in suitable suds. The motor 16 is started for operating the pump 14. Air is drawn from the space within the shell 12 below the container 10. The air discharged through the perforations 76 in the separator casing 74 constitutes a large part of the air that is drawn into the pump, on account of the fact that the space around the container and pump is enclosed by the shell 12. This avoids taking in any great amount of cold air, which might cool the water in the container too rapidly.

The air is pumped through the pipe 54 and drain pipe 32 to the chamber 18, which will, of course, be filled with water from the container 10. The air passes through the water in the chamber 18 and into the container 10 and through the water therein. In its upward passage through the container 10, the air thoroughly agitates the water in the container and thus facilitates the washing and cleaning of the clothes. The air then passes through the perforations in the plate 66 and thence through the carbon 72 which separates out the soap bubbles and a considerable amount of the moisture.

The air then passes through the perforations 68 and 70 into the separator casing 74. Most of the water will then be separated from the air and will return to the container 10. The air passes out through the perforations 76 and downwardly around the container 10 and is again taken into the pump 14.

By using the shell 12, all of the parts are enclosed and loss of heat is reduced to a minimum.

The air is withdrawn from the container 10 without carrying any substantial amount of moisture and is separated from the soap and suds in a convenient and efficient way.

The entire device can be built into a clothes washing machine for example, which can be built and operated very economically.

It will be seen that an agitator of this kind may be used for dish washing machines and other washing mechanisms and operations.

A noteworthy feature of the present structure is found in the arrangement of the bottom 10a of the container with its low spot arranged in communication with the chamber 18, by which arrangement draining of the container 10 is facilitated downwardly through the chamber 18, drain pipe 32 and discharged through the control cock 56.

Some changes may be made in details of structure and arrangement without departing from the real spirit and purpose of my invention, and it is my intention to cover by my claims any modified forms of structure or use of mechanical equivalents, which may be reasonably included within their scope.

I claim as my invention:

1. In a structure of the class described, a container for water, an open bottom tubular shell outside said container and spaced laterally from and projecting below the container, a cover for said container, a cover for the space between the container and the shell, a pump for pumping air from the space between the container and the shell and into the bottom of the container and means near the top of the container for separating air and water received therein from the container, said means having open communication with the interior of the upper part of the container and having a drain pipe connected with the lower part of the container for returning water thereto, said means being perforated to permit the air from the container to pass into the space between the container and the shell.

2. In a structure of the class described, a container, a tubular shell around the container spaced laterally from and projecting below the container, a cover for the container, a cover for the space between the container and the shell and constituting means for supporting the container within the shell, a chamber having open communication with the lower part of the container at a plurality of spaced points, a pump arranged below the container and chamber within the shell for pumping air to the chamber, a pipe leading from the pump to the chamber having a portion extending above the highest level of the liquid in the container, whereby to prevent passage of water from the container to the pump, means near the top of the container for separating moist air and water and returning the water to the container and discharging the air from the container to the space between the container and the shell and means for conducting air from said container to said last named separating means.

3. In a structure of the class described, a container, a tubular shell around the container spaced laterally from and projecting below the container, a cover for the container, a cover for the space between the container and the shell, and constituting means for supporting the container within the shell, a chamber having open communication with the lower part of the container at a plurality of spaced points, a pump arranged below the container and chamber within the shell for pumping air to the chamber, a pipe leading from the pump to the chamber, having a portion extending above the highest level of the liquid in the container, whereby to prevent passage of water from the container to the pump, there being perforations for permitting the escape of air from the container and means through which said escaping moist air passes for condensing the moisture and returning the latter to the container.

4. In a structure of the class described, a container having a bottom with a low point, a chamber below the bottom of the container, there being an opening through the lowest part of the bottom of said container which opens into said chamber, said chamber having open communication through the bottom of the container at points distributed about the lowest part of said bottom, and means for forcing air into said chamber and therethrough to the container for agitating liquid contents of the container, said means comprising a pump below the chamber and container, a drain pipe leading from said chamber and inclined downwardly having a control cock at its outer end and a pipe leading from said pump upwardly to a point above the highest level of the liquid in the container, whereby to prevent passage of water from said container to said pump and thence downwardly to and communicating with said drain pipe adjacent said control cock.

5. In a structure of the class described, a container having a closed top, means for forcing air into the bottom of the container at a plurality of spaced points, a liquid separating device at the upper part of the container through which moist air may be discharged from the container and the moisture from such air conducted back to the container, said liquid separating device comprising a holder mounted in the container wall having a perforated intake portion communicating with the interior of the container and a perforated discharge portion extending outside the container, a separator casing receiving that portion of the holder extending outside the container communicating at its lower end with the lower part of the container and having air discharge means at its upper portion.

6. In a structure of the class described, a container, a chamber having open communication with the lower part of the container at a plurality of spaced points, a pump for pumping air into the chamber, means near the top of the chamber for separating moist air and water and returning the moisture to the container and discharging the air from the container and means for conducting air from the container to said last named separating means.

Des Moines, Iowa, April 5, 1929.

MARK S. SCOFIELD.